United States Patent
Matsuda

(10) Patent No.: US 11,041,427 B2
(45) Date of Patent: Jun. 22, 2021

(54) PARALLEL HYBRID VEHICLE

(71) Applicant: KAWASAKI JUKOGYO KABUSHIKI KAISHA, Kobe (JP)

(72) Inventor: Yoshimoto Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/690,406

(22) Filed: Nov. 21, 2019

(65) Prior Publication Data

US 2020/0173341 A1  Jun. 4, 2020

(30) Foreign Application Priority Data

Dec. 4, 2018 (JP) .............. JP2018-227335

(51) Int. Cl.
| | | |
|---|---|---|
| *F01P 7/14* | (2006.01) | |
| *B60K 6/485* | (2007.10) | |
| *B60W 10/30* | (2006.01) | |
| *B60K 6/48* | (2007.10) | |
| *F01P 5/12* | (2006.01) | |
| *F01P 7/04* | (2006.01) | |

(52) U.S. Cl.
CPC ........ *F01P 7/14* (2013.01); *B60K 6/48* (2013.01); *B60K 6/485* (2013.01); *B60W 10/30* (2013.01); *F01P 5/12* (2013.01); *F01P 7/042* (2013.01); *F01P 2005/125* (2013.01); *F01P 2050/24* (2013.01); *F01P 2070/10* (2013.01)

(58) Field of Classification Search
CPC ........ F01P 7/14; F01P 205/16; F01P 2050/24; F01P 2070/10; F01P 5/12; F01P 2005/046; F01P 2005/125; F01P 5/10; F01P 7/04; F01P 7/042; B60K 6/485; B60K 2006/4816; B60K 6/48; B60K 6/547; B60W 10/30; B60W 20/13; F04D 13/028; F02B 63/04

See application file for complete search history.

(56) References Cited

U.S. PATENT DOCUMENTS

| | | | | |
|---|---|---|---|---|
| 6,668,766 | B1 * | 12/2003 | Liederman | F01P 5/12 123/198 C |
| 6,852,062 | B1 * | 2/2005 | Ahner | B60W 20/40 477/2 |
| 8,978,600 | B2 * | 3/2015 | Shutty | F04D 15/0066 123/41.47 |
| 2003/0116368 | A1 * | 6/2003 | Winkelman | B60K 6/383 180/65.25 |
| 2011/0123365 | A1 * | 5/2011 | Buchholz | F01P 5/12 417/319 |

(Continued)

FOREIGN PATENT DOCUMENTS

| | | |
|---|---|---|
| EP | 2527177 A1 | 11/2012 |
| JP | H10339185 A | 12/1998 |

*Primary Examiner* — Syed O Hasan
(74) *Attorney, Agent, or Firm* — Alleman Hall Creasman & Tuttle LLP

(57) ABSTRACT

A parallel hybrid vehicle includes: an engine serving as a drive source for travel of the parallel hybrid vehicle; an electric motor serving as a drive source for travel of the parallel hybrid vehicle; and a water pump that causes a cooling liquid to circulate in a cooling path. The water pump is connected to the engine to receive power from the engine and is connected to the electric motor to receive power from the electric motor.

9 Claims, 5 Drawing Sheets

(56) References Cited

U.S. PATENT DOCUMENTS

2012/0173063 A1* 7/2012 Madurai Kumar ...... B60K 6/48
  701/22
2015/0354447 A1 12/2015 Hemphill et al.
2018/0050686 A1 2/2018 Atluri et al.

* cited by examiner

| | EV mode | HEV mode | EGV mode |
|---|---|---|---|
| Electric motor | ◯ (Driving) | ◯ (Driving) | ◯ (Driving) |
| Engine | × | ◯ | ◯ |
| Main clutch | Disengaged | Engaged | Engaged |
| Water pump | ◯ | ◯ | ◯ |
| Oil pump | ◯ | ◯ | ◯ |

◯ : Rotated
× : Stopped

PARALLEL HYBRID VEHICLE

CROSS-REFERENCE TO RELATED APPLICATION

This application claims priority to and the benefit of Japanese Patent Application No. 2018-227335, filed on Dec. 4, 2018, the entire disclosure of which is incorporated herein by reference.

BACKGROUND OF THE INVENTION

Field of the Invention

The present disclosure relates to a parallel hybrid vehicle including a water pump.

Description of the Related Art

A parallel hybrid vehicle is known which includes an engine and an electric motor as drive sources for travel of the vehicle, the engine and electric motor being coupled to a drive wheel to transmit power to the drive wheel (see Japanese Laid-Open Patent Application Publication No. H10-339185, for example). In such a hybrid vehicle, components such as the engine, the electric motor, and an inverter heat up, and these components need to be cooled. However, with a conventional configuration in which the engine is connected to a water pump for circulation of a cooling liquid, the function of the water pump may be lost upon stoppage of the engine. To address this problem, Patent Literature 1 proposes providing an auxiliary motor separately from the drive sources for travel and driving the water pump using the auxiliary motor during stoppage of the engine.

With the configuration of Patent Literature 1, however, the need for additionally providing the auxiliary motor for the water pump leads to reduction in the component-mounting space of the vehicle and also to increase in the vehicle weight and component cost.

SUMMARY OF THE INVENTION

It is an object of the present disclosure to ensure the maintenance of the function of a water pump in a parallel hybrid vehicle and at the same time achieve improvement in the use efficiency of the component-mounting space of the vehicle and reduction in the vehicle weight and component cost.

A parallel hybrid vehicle according to an aspect of the present disclosure includes: an engine serving as a drive source for travel of the parallel hybrid vehicle; an electric motor serving as a drive source for travel of the parallel hybrid vehicle; and a water pump that causes a cooling liquid to circulate in a cooling path, wherein the water pump is connected to the engine to receive power from the engine and is connected to the electric motor to receive power from the electric motor.

With the above configuration, the water pump is driven by rotational power of the engine when the engine is in operation, while when the electric motor is in operation, the water pump is driven by rotational power of the electric motor. Thus, the water pump is driven by the electric motor when the engine is not in operation and by the engine when the electric motor is not in operation. In the parallel hybrid vehicle, therefore, the water pump can be driven even during stoppage of the engine, and the need for an auxiliary motor dedicated for driving of the water pump can be eliminated. Consequently, the use efficiency of the component-mounting space of the vehicle can be improved, and the vehicle weight and component cost can be reduced.

In an example, the vehicle may further include a transmission including an input shaft, an output shaft, and a gear train, the transmission being configured to change the speed of rotational power output from the engine and the electric motor at a selected gear ratio and configured to output the resulting rotational power to a drive wheel. In this example, rotational power of the engine may be transmitted to the electric motor via the input shaft of the transmission, and the water pump may be connected to the electric motor to receive power from the electric motor.

With this configuration, the engine can drive the water pump by means of the transmission during stoppage of the electric motor.

In an example, the vehicle may further include: a main clutch provided in a power transmission route between a crankshaft of the engine and the input shaft of the transmission; a first one-way clutch that permits transmission of power from the engine to the water pump; and a second one-way clutch that permits transmission of power from the electric motor to the water pump.

With this configuration, the water pump connected to the electric motor can be driven with power transmitted from the engine even when the main clutch is disengaged.

In an example, a first power transmission route for power transmission from the engine to the water pump via the first one-way clutch and a second power transmission route for power transmission from the electric motor to the water pump via the second one-way clutch may be different from a power transmission route of the transmission.

With this configuration, the flexibility in arrangement of the water pump can be increased while the transmission is kept compact.

In an example, a crankshaft of the engine, a rotation shaft of the electric motor, the input shaft of the transmission, and the output shaft of the transmission may be arranged parallel to one another, and a drive shaft of the water pump may be disposed coaxially with or parallel to one of the crankshaft, the rotation shaft, the input shaft, and the output shaft.

With this configuration, the space efficiency in arrangement of the transmission mechanism and the water pump can be improved, and the improved space efficiency can contribute to size reduction of the vehicle.

In an example, the vehicle may further include an oil pump that causes a lubricant oil to circulate in a lubrication path, and the water pump and the oil pump may be coaxially connected to each other.

With this configuration, the need for an auxiliary motor dedicated for driving of the water pump and the oil pump is eliminated, and the cooling liquid and the lubricant oil can be circulated both when the engine is not in operation and when the electric motor is not in operation. Additionally, the space efficiency can be improved.

In an example, the vehicle may further include: an inverter operable to bring the electric motor into operation; a radiator provided in the cooling path; and at least one valve provided in the cooling path, wherein the cooling path includes: a common cooling path passing through the radiator; an engine cooling path branching from the common cooling path to enable cooling of the engine; and an electric component cooling path branching from the common cooling path to enable cooling of at least one of the electric motor and the inverter, the valve is switchable between a first state in which the valve allows the engine cooling path to be open and a second state in which the valve restricts flow of the cooling liquid through the engine cooling path so that the flow of the cooling liquid through the engine cooling path is less than that in the first state, the valve is in the first state when the electric motor is in a non-driving state and the engine is in a driving state, and the valve is in the second state when the engine is in a non-driving state and the electric motor is in a driving state.

With this configuration, when the engine is stopped and does not need to be cooled, the flow of the cooling liquid from the common cooling path into the engine cooling path is restricted, while when the engine is in operation and needs to be cooled, the flow of the cooling liquid from the common cooling path into the engine cooling path is promoted. This provides improved efficiency of cooling of the drive system for travel of the parallel hybrid vehicle.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

First Embodiment

Figure 1:
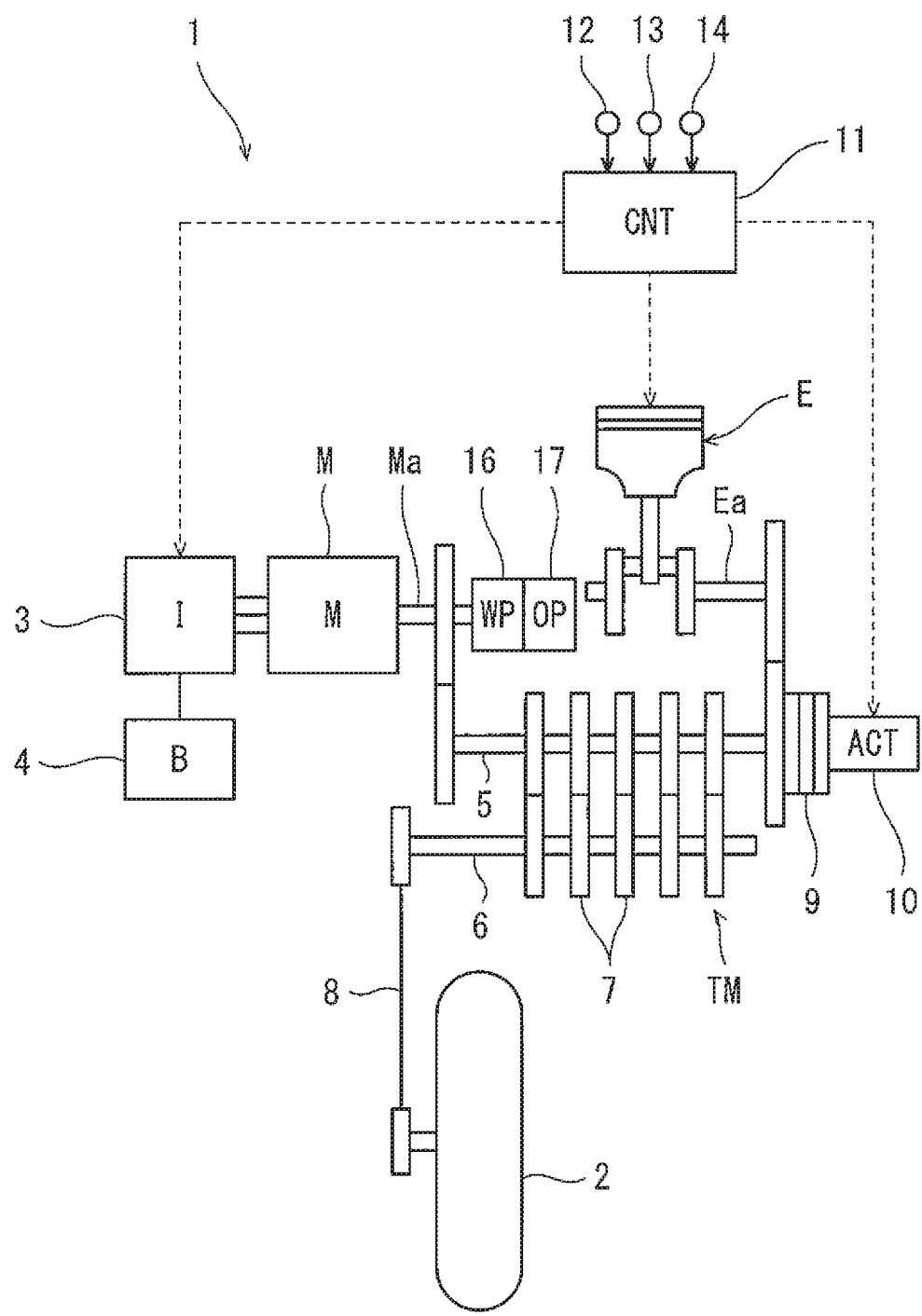
FIG. 1 is a configuration diagram of a parallel hybrid vehicle according to a first embodiment.

FIG. 1 is a configuration diagram of a parallel hybrid vehicle 1 according to a first embodiment. As shown in FIG. 1, the vehicle 1 is, for example, a motorcycle. The vehicle 1 includes an unillustrated driven wheel (front wheel) and a drive wheel 2 (rear wheel). The vehicle 1 includes an engine E and an electric motor M. The engine E and electric motor M are disposed between the front wheel (driven wheel) and rear wheel (drive wheel 2).

The engine E is an internal combustion engine. The engine E serves as a drive source for travel which drives the drive wheel 2. The engine E serves also as an electricity generator drive source. The engine E is, for example, a four-stroke engine.

The electric motor M generates power from electricity supplied from a battery 4 via an inverter 3, thus serving as a drive source for travel which drives the drive wheel 2. The electric motor M generates electricity from power transmitted from an input shaft 5 of a transmission TM, thus serving also as an electricity generator that electrically charges the battery 4.

The vehicle 1 includes the transmission TM, which is configured to change the speed of rotational power output from the engine E and the electric motor M and transmit the resulting rotational power to the drive wheel 2. The transmission TM is, for example, a manual transmission that performs a gear-shifting process by mechanically responding to a manual operation performed by the driver of the vehicle. The transmission TM includes the input shaft 5, an output shaft 6, and a gear train 7. The input shaft 5 receives rotational power output from the engine E and the electric motor M. The gear train 7 changes the speed of rotation transmitted from the input shaft 5 at a selected gear ratio and transmits the resulting rotation to the output shaft 6. The output shaft 6 receives the rotational power resulting from the speed change by the gear train 7, and outputs this rotational power to the drive wheel 2 via an output transmission member 8 (e.g., a chain or a belt).

A crankshaft Ea of the engine E, a rotation shaft Ma of the electric motor M, the input shaft 5 of the transmission TM, and the output shaft 6 of the transmission TM are arranged parallel to one another. The rotational power of the crankshaft Ea of the engine E is input to the input shaft 5 at one axial end (right end in FIG. 1) of the input shaft 5 via a main clutch 9. The rotational power of the rotation shaft Ma of the electric motor M is input to the input shaft 5 at the other axial end (left end in FIG. 1) of the input shaft 5. Thus, the power transmission route from the electric motor M to the input shaft 5 is different from the power transmission route from the engine E to the input shaft 5.

With the main clutch 9 engaged, the rotational power of the crankshaft Ea of the engine E is transmitted to the electric motor M via the input shaft 5 of the transmission TM. Thus, the rotational power of the crankshaft Ea of the engine E can cause the electric motor M to operate for electricity generation or cause the electric motor M to run idle in a state where the circuit of the electric motor M is open. With the main clutch 9 disengaged, the rotational power of the rotation shaft Ma of the electric motor M is not transmitted to the engine E. Thus, when the electric motor M is in operation, the main clutch 9 can be disengaged to prevent the engine E from acting as a resistance.

The main clutch 9 (e.g., a multi-plate clutch) is provided in the power transmission route between the crankshaft Ea of the engine E and the input shaft 5 of the transmission TM. The main clutch 9 is actuated by a clutch actuator 10 to be disengaged and engaged. The power transmission route between the rotation shaft Ma of the electric motor M and the input shaft 5 of the transmission TM is constantly kept in a power transmission state.

The vehicle 1 includes a controller 11. The controller 11 includes a processor, a volatile memory, a non-volatile memory, and an I/O interface. The controller 11 receives output signals such as those from an accelerator operation amount sensor 12, an engine speed sensor 13, and a battery sensor 14 via the I/O interface. The controller 11 controls the engine E (in particular, the throttle valve, fuel injection valve, and ignition plug of the engine), the electric motor M, and the clutch actuator 10. The processor makes reference to information such as that obtained from the sensors 12 to 14 and performs processing operations using the volatile memory according to a program stored in the non-volatile memory, thereby controlling the engine E, the electric motor M, and the clutch actuator 10.

The vehicle 1 includes a water pump 16 and an oil pump 17. The water pump 16 causes a cooling liquid to circulate in a cooling path for cooling of the engine E and the inverter 3. The oil pump 17 causes a lubricant oil to circulate in a lubrication path for lubrication of the engine E, the transmission TM, and other lubrication targets 18. The water pump 16 and the oil pump 17 are connected to the electric motor M to receive power from the electric motor M, and are therefore connected to the engine E to receive power from the engine E. In the present embodiment, the water pump 16 and the oil pump 17 are coaxially connected to each other. The drive shafts of the water pump 16 and oil pump 17 are disposed coaxially with the rotation shaft Ma of the electric motor M and are coupled to the rotation shaft Ma of the electric motor M. Thus, the water pump 16 and the oil pump 17 can be compactly arranged to prevent size increase of the vehicle.

Figure 2:
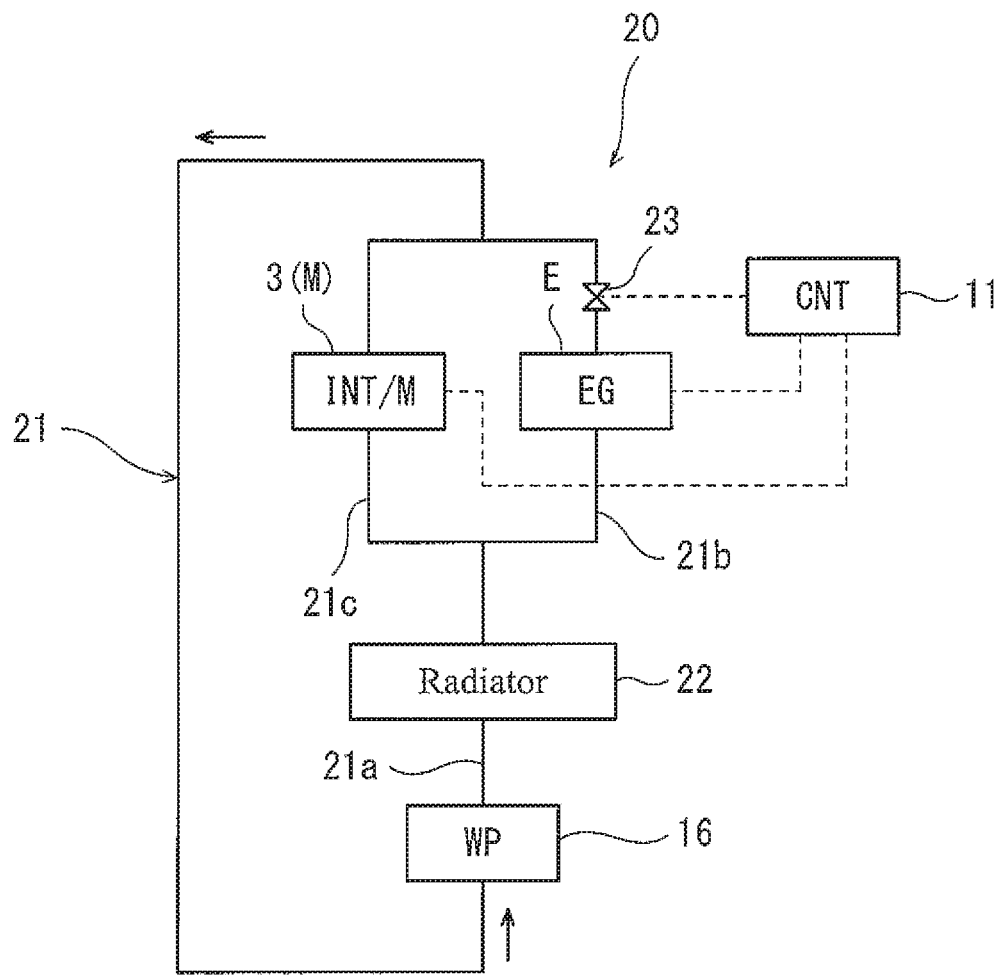
FIG. 2 is a block diagram of a cooling system of the vehicle of FIG. 1.

FIG. 2 is a block diagram of a cooling system 20 of the vehicle 1 of FIG. 1. As shown in FIG. 2, the cooling system 20 includes a cooling path 21 configured as a closed circuit. The cooling path 21 includes a common cooling path 21a, an engine cooling path 21b, and an electric component cooling path 21c. The common cooling path 21a extends so as to connect the water pump 16 and a radiator 22 in series. The engine cooling path 21b branches from the common cooling path 21a to enable cooling of the engine E. For example, the engine cooling path 21b passes through a water jacket (not shown) provided for the engine E. The electric component cooling path 21c branches from the common cooling path 21a to enable cooling of the inverter 3 (and/or the motor M). For example, the electric component cooling path 21c passes through a water jacket (not shown) provided for the inverter 3 (and/or the motor M). The electric component cooling path 21c may be configured to further enable cooling of the electric motor M.

At least one valve is provided in the cooling path 21. Referring to FIG. 2, the at least one valve consists of a valve 23 provided in the engine cooling path 21b. The valve 23 is configured to be switchable between a first state in which the valve 23 allows the engine cooling path 21b to be fully open and a second state in which the valve 23 restricts flow of the cooling liquid through the engine cooling path 21b so that the flow of the cooling liquid through the engine cooling path is less than that in the first state. In the present embodiment, the first state is a fully open state, and the second state is a closed state. The second state may be a state in which the valve is open to a smaller degree than in the first state.

When the electric motor M is in a non-driving state and the engine E is in a driving state, the controller 11 brings the valve 23 into the first state (open state), while when the engine E is in a non-driving state and the electric motor M is in a driving state, the controller 11 brings the valve 23 into the second state (closed state). Thus, when the engine E is stopped and does not need to be cooled, the cooling liquid flows principally into the electric component cooling path 21c from the common cooling path 21a, while when the electric motor M is stopped and does not need to be cooled, the cooling liquid flows principally into the engine cooling path 21b from the common cooling path 21a. This provides improved efficiency of cooling of the drive system for travel of the parallel hybrid vehicle 1.

Alternatively, a valve may be provided also in the electric component cooling path 21c. That is, a configuration may be employed in which the at least one valve provided in the cooling path 21 includes the valve 23 provided in the engine cooling path 21b and a valve (not shown) provided in the electric component cooling path 21c. In this case, it is advantageous that the first state of the at least one valve provided in the cooling path 21 be a state in which the flow through the engine cooling path 21b is favored over the flow through the electric component cooling path 21c and that the second state of the at least one valve provided in the cooling path 21 be a state in which the flow through the electric component cooling path 21c is favored over the flow through the engine cooling path 21b. Specifically, the first state may be a state in which the valve 23 of the engine cooling path 21b is open while the valve (not shown) of the electric component cooling path 21c is closed, and the second state may be a state in which the valve 23 of the engine cooling path 21b is closed while the valve (not shown) of the electric component cooling path 21c is open.

Figures 3, 4:
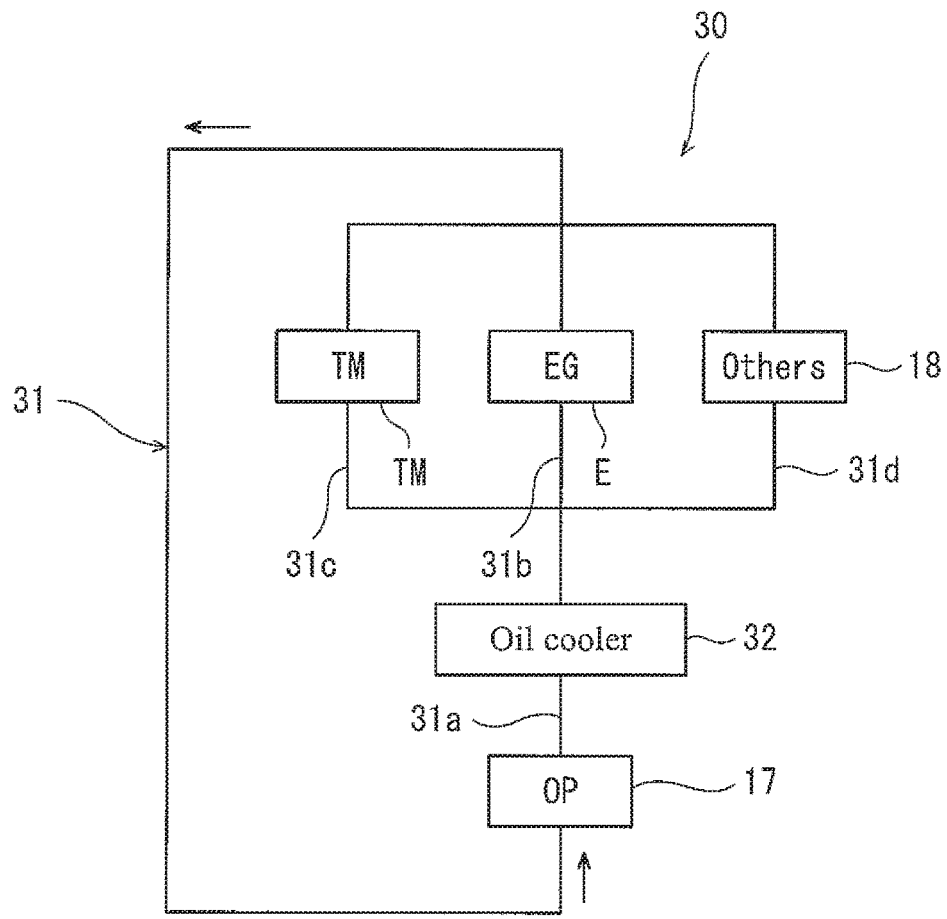
FIG. 3 is a block diagram of a lubrication system of the vehicle of FIG. 1.
FIG. 4 is a table illustrating the state of the vehicle of FIG. 1 in different modes.

FIG. 3 is a block diagram of a lubrication system 30 of the vehicle 1 shown in FIG. 1. As shown in FIG. 3, the lubrication system 30 includes a lubrication path 31 configured as a closed circuit. The lubrication path 31 includes a common lubrication path 31a, an engine lubrication path 31b, a transmission lubrication path 31c, and an additional lubrication path 31d. The common lubrication path 31a extends so as to connect the oil pump 17 and an oil cooler 32 in series. The engine lubrication path 31b branches from the common lubrication path 31a to enable lubrication of the engine E. For example, the engine lubrication path 31b passes through an actuation system for intake and exhaust valves of the engine E. The transmission lubrication path 31c branches from the common lubrication path 31a to enable lubrication of the transmission TM. For example, the transmission lubrication path 31c serves in lubrication of the gear train 7 of the transmission TM. The additional lubrication path 31d serves in lubrication of the other lubrication targets 18 (such as bearings).

FIG. 4 is a table illustrating the state of the vehicle 1 of FIG. 1 in different modes. In the parallel hybrid vehicle 1, as shown in FIG. 4, the controller 11 selects one mode from a plurality of travel modes including an EV mode, an HEV mode, and an EGV mode, and controls the engine E, the electric motor M, and the clutch actuator 10.

The EV mode is a mode in which the engine E is stopped and the drive wheel 2 is driven with power generated by the electric motor M. In the EV mode, the clutch actuator 10 brings the main clutch 9 into a disengaged state to prevent the engine E from acting as a resistance when the electric motor M is in operation. In the EV mode, the electric motor M is brought into the driving state during acceleration, while during deceleration, the electric motor M is brought into a regeneration state.

The HEV mode is a mode in which the drive wheel 2 is driven with power generated by the electric motor M and the engine E. In the HEV mode, the clutch actuator 10 brings the main clutch 9 into an engaged state to allow the rotational power of the engine E to be transmitted to the drive wheel 2 via the transmission TM. In the HEV mode, the electric motor M is brought into the driving state during acceleration, while during deceleration, the electric motor M is brought into a regeneration state.

The EGV mode is a mode in which the engine E is brought into operation with the electric motor M not in operation so as to drive the drive wheel 2 only with rotational power of the engine E. In the EGV mode, the clutch actuator 10 brings the main clutch 9 into an engaged state to allow the rotational power of the engine E to be transmitted to the drive wheel 2 via the transmission TM. In the EGV mode, the electric motor M is in a regeneration state or an idle running state (free state) both during acceleration and during deceleration. That is, in the EGV mode, power of the engine E is transmitted to the electric motor M via the input shaft 5, and thus the rotation shaft Ma of the electric motor M is rotated although the electric motor M is not brought into operation.

In the parallel hybrid vehicle 1, as seen from the table of FIG. 4, the water pump 16 and oil pump 17 are driven by rotational power of the engine E when the engine E is in operation, while when the electric motor M is in operation, the water pump 16 and oil pump 17 are driven by rotational power of the electric motor M. Thus, the water pump 16 and oil pump 17 are driven by the electric motor M when the engine E is not in operation and by the engine E when the electric motor M is not in operation. In the parallel hybrid vehicle 1, therefore, the water pump 16 and oil pump 17 can be driven even during stoppage of the engine E, and the need for an auxiliary motor dedicated for driving of the water pump 16 and oil pump 17 can be eliminated. Consequently, the use efficiency of the component-mounting space of the vehicle can be improved, and the vehicle weight and component cost can be reduced.

Second Embodiment

Figure 5:
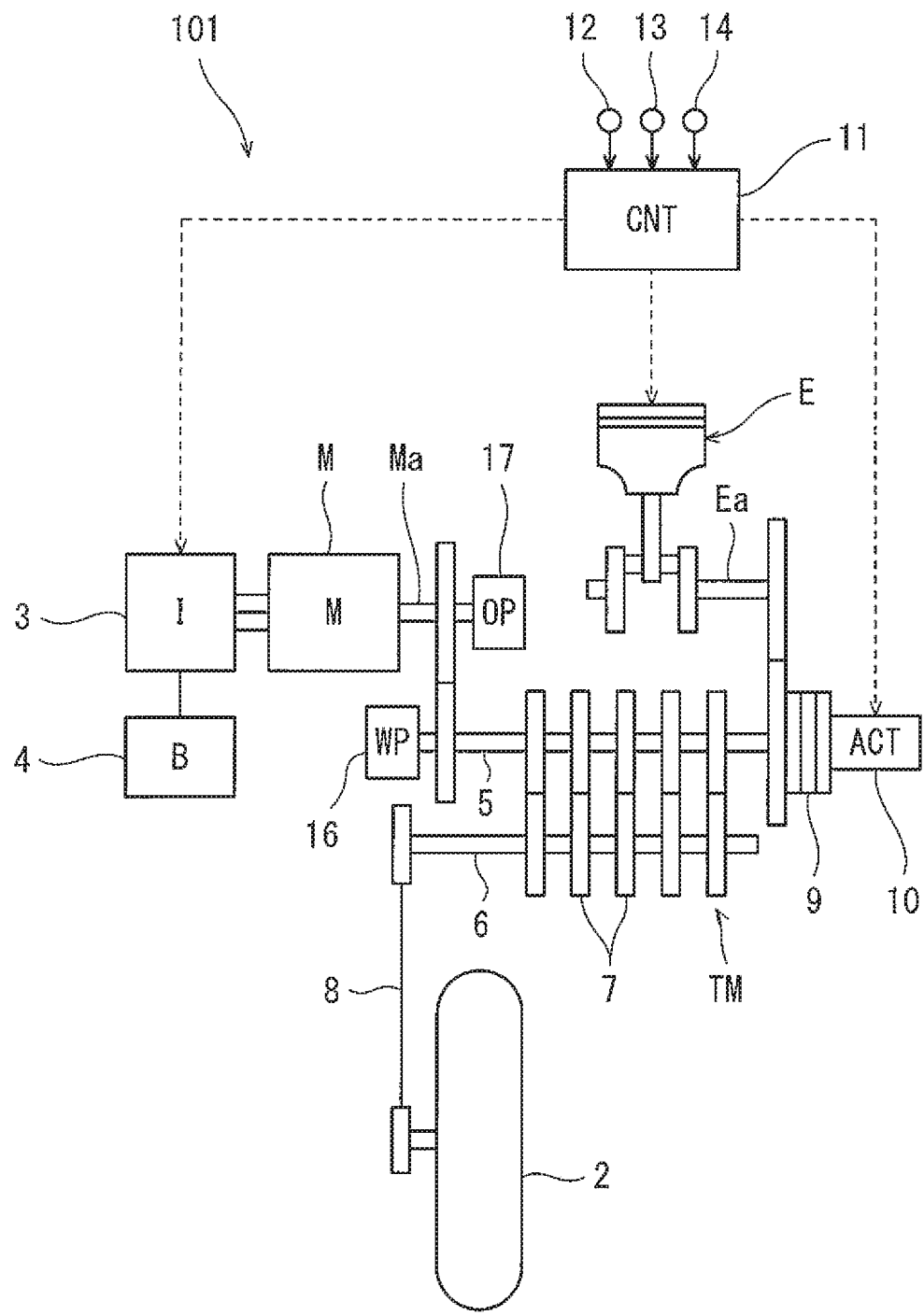
FIG. 5 is a configuration diagram of a parallel hybrid vehicle according to a second embodiment.

FIG. 5 is a configuration diagram of a parallel hybrid vehicle 101 according to a second embodiment. In the parallel hybrid vehicle 101 of the second embodiment, as seen from FIG. 5, the water pump 16 is disposed in a different way. In the parallel hybrid vehicle 101, the drive shaft of the water pump 16 is disposed coaxially with, and coupled to, the input shaft 5 of the transmission TM. The drive shaft of the oil pump 17 is disposed coaxially with, and coupled to, the rotation shaft Ma of the electric motor M. With this configuration, as in the first embodiment, the water pump 16 and oil pump 17 can be driven irrespective of the travel mode and without the need for providing an auxiliary motor dedicated for driving of the water pump 16 and oil pump 17. The other elements are the same as those of the first embodiment described above. The same elements are denoted by the same reference signs and will not be described again.

Third Embodiment

Figure 6:
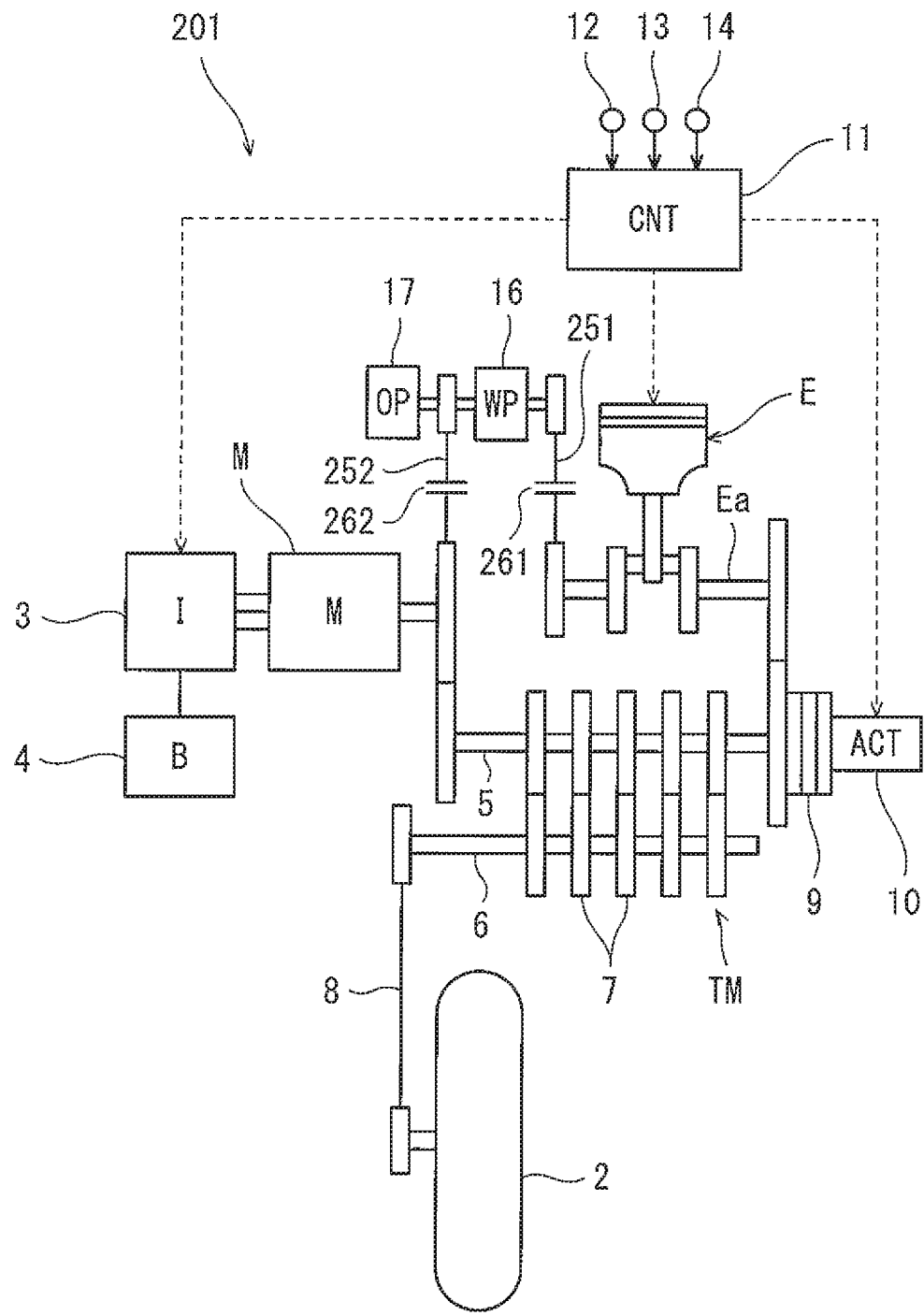
FIG. 6 is a configuration diagram of a parallel hybrid vehicle according to a third embodiment.

FIG. 6 is a configuration diagram of a parallel hybrid vehicle 201 according to a third embodiment. In the parallel hybrid vehicle 201 of the third embodiment, as shown in FIG. 6, the drive shaft of the water pump 16 is coupled to the crankshaft Ea of the engine E via a first one-way clutch 261. The first one-way clutch 261 permits transmission of power from the crankshaft Ea of the engine E to the water pump 16, and prohibits transmission of power from the water pump 16 to the crankshaft Ea of the engine E.

The drive shaft of the water pump 16 is coupled to the rotation shaft Ma of the electric motor M via a second one-way clutch 262. The second one-way clutch 262 permits transmission of power from the rotation shaft Ma of the electric motor M to the water pump 16, and prohibits transmission of power from the water pump 16 to the rotation shaft Ma of the electric motor M. The drive shaft of the oil pump 17 is coupled to the drive shaft of the water pump 16. For example, the drive shaft of the oil pump 17 is disposed coaxially with the drive shaft of the water pump 16.

With this configuration, the water pump 16 and oil pump 17 connected to the electric motor M can be driven with power transmitted from the engine E even when the main clutch 9 is disengaged.

Additionally, a first power transmission route 251 for power transmission from the engine E to the water pump 16 via the first one-way clutch 261 and a second power transmission route 252 for power transmission from the electric motor M to the water pump 16 via the second one-way clutch 262 are different from the power transmission route of the transmission TM. Thus, the flexibility in arrangement of the water pump 16 and oil pump 17 can be increased while the transmission TM is kept compact. The other elements are the same as those of the first embodiment described above. The same elements are denoted by the same reference signs and will not be described again.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A parallel hybrid vehicle comprising:
   an engine serving as a drive source for travel of the parallel hybrid vehicle;
   an electric motor serving as a drive source for travel of the parallel hybrid vehicle;
   a water pump that causes a cooling liquid to circulate in a cooling path;
   a main clutch provided in a power transmission route between a crankshaft of the engine and the input shaft of the transmission;
   a first one-way clutch that permits transmission of power from the engine to the water pump;
   a second one-way clutch that permits transmission of power from the electric motor to the water pump, wherein
   the water pump is connected to the engine to receive power from the engine and is connected to the electric motor to receive power from the electric motor;
   a transmission comprising an input shaft, an output shaft, and a gear train, the transmission being configured to change the speed of rotational power output from the engine and the electric motor at a selected gear ratio and configured to output the resulting rotational power to a drive wheel, wherein
   rotational power of the engine is transmitted to the electric motor via the input shaft of the transmission.

2. The parallel hybrid vehicle according to claim 1, wherein a first power transmission route for power transmission from the engine to the water pump via the first one-way clutch and a second power transmission route for power transmission from the electric motor to the water pump via the second one-way clutch are different from the power transmission route of the transmission.

3. The parallel hybrid vehicle according to claim 1, wherein
   the crankshaft of the engine, a rotation shaft of the electric motor, the input shaft of the transmission, and the output shaft of the transmission are arranged parallel to one another, and
   a drive shaft of the water pump is disposed coaxially with or parallel to one of the crankshaft, the rotation shaft, the input shaft, and the output shaft.

4. The parallel hybrid vehicle according to claim 1, further comprising an oil pump that causes a lubricant oil to circulate in a lubrication path, wherein
   the water pump and the oil pump are coaxially connected to each other.

5. The parallel hybrid vehicle according to claim 1, further comprising:
   an inverter operable to bring the electric motor into operation;
   a radiator provided in the cooling path; and
   at least one valve provided in the cooling path, wherein the cooling path comprises: a common cooling path passing through the radiator; an engine cooling path branching from the common cooling path to enable cooling of the engine; and an electric component cooling path branching from the common cooling path to enable cooling of at least one of the electric motor and the inverter, the valve is switchable between a first state in which the valve allows the engine cooling path to be open and a second state in which the valve restricts flow of the cooling liquid through the engine cooling path so that the flow of the cooling liquid through the engine cooling path is less than that in the first state, the valve is in the first state when the electric motor is in a non-driving state and the engine is in a driving state, and the valve is in the second state when the engine is in a non-driving state and the electric motor is in a driving state.

6. The parallel hybrid vehicle according to claim 1, wherein the crankshaft of the engine, a rotation shaft of the electric motor, the input shaft of the transmission, and the output shaft of the transmission are arranged parallel to one another.

7. A parallel hybrid vehicle comprising:
- an engine serving as a drive source for travel of the parallel hybrid vehicle;
- an electric motor serving as a drive source for travel of the parallel hybrid vehicle;
- a circulation pump that causes a liquid to circulate in a circulation path,
- a main clutch provided in a power transmission route between a crankshaft of the engine and an input shaft of a transmission,
- a first one-way clutch that permits transmission of power from the engine to the circulation pump; and
- a second one-way clutch that permits transmission of power from the electric motor to the circulation pump, wherein the circulation pump is connected to the engine to receive power from the engine and is connected to the electric motor to receive power from the electric motor, a transmission comprising an input shaft, an output shaft, and a gear train, the transmission being configured to change the speed of rotational power output from the engine and the electric motor at a selected gear ratio and configured to output the resulting rotational power to a drive wheel, wherein the circulation pump is configured to supply the liquid to the transmission.

8. The parallel hybrid vehicle according to claim 7, wherein
rotational power of the engine is transmitted to the electric motor via the input shaft of the transmission, and
the circulation pump is configured to supply the liquid to the transmission.

9. The parallel hybrid vehicle according to claim 7, wherein the crankshaft of the engine, a rotation shaft of the electric motor, the input shaft of the transmission, and the output shaft of the transmission are arranged parallel to one another.

* * * * *